UNITED STATES PATENT OFFICE 2,623,868

LINEAR POLY-4-AMINO-1,2,4 TRIAZOLES

Friedrich Georg Kleinschrod and James Wotherspoon Fisher, Spondon, near Derby, England, assignors to British Celanese Limited, a corporation of Great Britain No Drawing. Application October 27, 1950, Serial No. 192,594. In Great Britain November 8, 1949

8 Claims. (Cl. 260—78.4)

This invention relates to improvements in the production of polymeric materials and is more particularly concerned with the production of polymers suitable for the formation of filaments and films.

In U. S. Patents Nos. 2,512,600 and 2,512,667, there are described processes for the production of polyaminotriazoles by condensing the dihydrazides of dicarboxylic acids in the presence of free hydrazine or by condensing the free dicarboxylic acid or its esters or anhydride with hydrazine in a proportion of more than two moles of hydrazine to each mole of dicarboxylic acid. If desired, the salt of the free dicarboxylic acid with hydrazine could be used with the requisite additional quantity of hydrazine. Generally it will be seen that the reagents for forming these polymers are such that on hydrolysis they yield a mixture of a dicarboxylic acid and hydrazine, the amount of hydrazine being sufficient to yield a polymer resistant to hydrochloric acid. Generally the amount of hydrazine is more than two moles per mole of dicarboxylic acid. The specifications show how to carry out the condensation so that the products have good fibre-forming properties.

As indicated in the specifications, at the end of the condensation some of the terminal groups of the polymers consist of hydrazide groups so that the polymers are capable of further condensation to produce a longer linear molecule. Such a tendency to increase the length of the molecule may be eliminated by hydrolysing the terminal hydrazide groups. The polymers, either as produced or when hydrolysed in this way, still exhibit some tendency to cross-linking, presumably by reaction between terminal carboxy groups and the exocyclic amino groups disposed along the polymer chain. Such cross-linking can, as disclosed in U. S. Patent No. 2,512,624, be eliminated by hydrolysing the cross-linked polymer, e. g. with water or steam under pressure or with a mineral acid.

We have now found a means whereby polymers may be made in which the tendency to increase the length of the chain or to undergo cross-linking is much reduced or even eliminated so that the improved polymers are capable of being held at high temperatures, e. g. of the order of 260–270° C., for considerable periods of time, for example 10 or 15 minutes. According to the invention, this is achieved by adding to the mixture for polymerisation a small quantity of an amide of a monocarboxylic acid. Such addition may take place at any stage before the polymer reaches the desired viscosity, including the case where the addition is made to the original polymer-forming reagents, i. e. before heating has begun. Thus the stabilisation according to the present invention differs from the stabilisation of polyamides in which a viscosity stabiliser can be added when the polymer has reached a molecular weight higher than that required, the stabiliser having the effect of reducing the molecular weight to the desired value. The polyamide-forming reaction is reversible while the polyaminotriazole-forming reaction is not reversible.

Acetamide is the preferred stabiliser according to the present invention but amides of other monocarboxylic acids may be used, for instance those of propionic acid, butyric acid, valeric acid, stearic acid or other fatty acids, lactic acid or benzoic acid.

The amount of stabilising agent to be added to achieve a given molecular weight of the polymer is not readily calculable as is the case in the known viscosity stabilisation of polyamides. However, the amount of stabiliser to be added to achieve a given final intrinsic viscosity is easily determined experimentally. The amount of stabiliser used may vary with the stage at which it is added.

Generally for the production of filament-forming polymers the amount of stabiliser used should be less than 10 molar per cent based on the dicarboxylic acid (or derivative thereof) and should usually be much less if the addition is made at the beginning or shortly after the beginning of the condensation. In such a case the amount required may be less than 6.5 molar per cent and is usually less than 5.5 molar per cent. To produce a polymer of good filament-forming and cold-drawing properties a proportion of stabiliser of 3 molar per cent or less may be used.

The main advantage of stabilising the polymer in the manner described above is that the stabilised polymer is capable of withstanding melt spinning temperatures for longer periods than the polymer not so stabilised. It is therefore possible to maintain a larger pool of molten polymer in the melt spinning apparatus without danger of serious decomposition or increase in viscosity of the polymer or formation of a rubbery polymer. Another advantage is that it facilitates carrying out the final stages of the polymerisation itself under atmospheric pressure or under vacuum, or in other words reduces the tendency under these conditions to obtain a polymer of poor quality, and thus facilitates removal of excess hydrazine or by-product ammonia and water.

Preferably according to the present invention the amount of stabiliser added and the stage at which it is added are such that the final polymer is fibre-forming, i. e. has an intrinsic viscosity of 0.3-0.4 or above. In the best method of carrying out the invention, the quantity of stabiliser and stage at which it is added are adjusted so that the final polymer has an intrinsic viscosity of 0.6 upwards and gives on melt spinning filaments which have good cold-drawing properties. Intrinsic viscosities as referred to in this specification means the hyperbolic logarithm of the relative viscosity of a meta-cresol solution of a concentration of 1 gram of polymer per 100 ccs. of solution, measured at 25° C.

While sebacic acid has been mentioned above as the dicarboxylic acid for forming the polymers, other dicarboxylic acids may be used, for example pimelic acid, suberic acid, azelaic acid, diphenic acid, phenylene-1.4-diacetic acid, sulphone-γ.γ'-dibutyric acid, sulphone-δ.δ'-divaleric acid and sulphone-ς.ς'-di-oenanthic acid.

The following examples illustrate the invention but are not intended to limit it in any way:

*Example 1*

50 parts by weight of sebacic acid were mixed with 50 parts by weight of 60% aqueous hydrazine and 0.4 part by weight of acetamide. The mixture was heated in an autoclave for 15 hours at 210° C. and then for 3 hours at 270° C., the pressure during the latter period being gradually reduced to 500 lbs. The product had an intrinsic viscosity of 0.6 and had good fibre-forming and cold-drawing properties. The polymer was capable of withstanding a temperature of 280° C. for 15 minutes.

*Example 2*

50 parts by weight of sebacic dihydrazide were mixed with 30 parts by weight of 60% aqueous hydrazine and 0.4 parts by weight of acetamide. The mixture was heated in an autoclave for 17 hours at 220° C. and then for 4 hours at 270° C., the pressure being released to 500 lbs. per square inch during the last 3 hours. The product had an intrinsic viscosity of 0.63 and had good fibre-forming and cold-drawing properties. It was capable of withstanding a temperature of 280° C. for 15 minutes.

*Example 3*

A polyaminotriazole of a fairly low degree of polymerisation was obtained as follows: 200 parts by weight of sebacic acid and 150 parts by weight of 60% aqueous hydrazine were heated in an autoclave slowly to 210° C. during a period of 3-4 hours. The autoclave was then kept for another 10 hours at this temperature. The product obtained had a melting point in the neighbourhood of 260° C. and the intrinsic viscosity of a variety of products prepared in this way varied between 0.35 and 0.40.

100 parts by weight of a low polymer prepared in this way were heated in a closed autoclave together with 15 parts by weight of 60% aqueous hydrazine and 1.3 parts by weight of acetamide to a temperature of 260° C. for a period of 5 hours. The product had an intrinsic viscosity of 0.61 and showed good fibre-forming and cold-drawing properties. Like the product prepared according to Examples 1 and 2 it was capable of withstanding a temperature of 280° C. for 15 minutes.

*Example 4*

50 parts by weight of a polyaminotriazole of low molecular weight prepared in the manner described in Example 3 and having an intrinsic viscosity of 0.37 were heated in an autoclave with 5 parts by weight of 60% aqueous hydrazine and 0.75 parts by weight of acetamide for 5 hours at 230° C. The product had a final intrinsic viscosity of 0.51. In a similar trial using only 3 parts by weight of 60% aqueous hydrazine and 0.2 parts by weight of acetamide with 50 parts by weight of the polyaminotriazole, a product was obtained which had an intrinsic viscosity of 0.64. Both products had fibre-forming and cold-drawing properties, those of the polymer of 0.64 intrinsic viscosity being particularly good, and both were capable of withstanding a temperature of 280° C. for 15 minutes.

Having described our invention, what we desire to secure by Letters Patent is:

1. Process for the production of linear poly-4-amino-1.2.4-triazoles, which comprises heating together reagents which on hydrolysis yield a mixture of dicarboxylic acid and sufficient hydrazine to yield a polymer resistant to hydrolysis by hydrochloric acid and before the polymer reaches the required viscosity adding an amide of a monocarboxylic acid in a quantity less than 5.5 molar per cent based on the dicarboxylic acid and continuing the heating until a polymer is produced.

2. Process according to claim 1, wherein the addition is made to the original polymer-forming mixture.

3. Process for the production of linear poly-4-amino-1.2.4-triazoles, which comprises heating together reagents which on hydrolysis yield a mixture of dicarboxylic acid and sufficient hydrazine to yield a polymer resistant to hydrolysis by hydrochloric acid and before the polymer reaches the required viscosity adding an amide of a monocarboxylic acid in a quantity less than 3 molar per cent based on the dicarboxylic acid and continuing the heating until a polymer is produced.

4. Process for the production of linear poly-4-amino-1.2.4-triazoles, which comprises heating together reagents which on hydrolysis yield a mixture of dicarboxylic acid and sufficient hydrazine to yield a polymer resistant to hydrolysis by hydrochloric acid and before the polymer reaches the required viscosity adding a quantity of acetamide less than 5.5 molar per cent based on the dicarboxylic acid and continuing the heating until a polymer is produced.

5. Process for the production of linear poly-4-amino-1.2.4-triazoles, which comprises heating together reagents which on hydrolysis yield a mixture of dicarboxylic acid and sufficient hydrazine to yield a polymer resistant to hydrolysis by hydrochloric acid and before the polymer reaches the required viscosity adding a quantity of acetamide less than 3 molar per cent based on the dicarboxylic acid and continuing the heating until a polymer is produced.

6. Process for the production of linear poly-4-amino-1.2.4-triazoles, which comprises heating together reagents which on hydrolysis yield a mixture of dicarboxylic acid and sufficient hydrazine to yield a polymer resistant to hydrolysis by hydrochloric acid and before the polymer reaches the required viscosity adding an amide of a monocarboxylic acid in quantity less than 3 molar per cent based on the dicarboxylic acid but insufficient to prevent the polymer reaching the fibre-forming stage and continuing the heating until a fibre-forming polymer is produced.

7. Process for the production of linear poly-4- amino-1.2.4-triazoles, which comprises heating together reagents which on hydrolysis yield a mixture of dicarboxylic acid and sufficient hydrazine to yield a polymer resistant to hydrolysis by hydrochloric acid and before the polymer reaches the required viscosity adding acetamide in quantity less than 3 molar per cent based on the dicarboxylic acid but insufficient to prevent the polymer reaching the fibre-forming stage and continuing the heating until a fibre-forming polymer is produced.

8. Process for the production of linear poly-4-amino-1.2.4-triazoles, which comprises heating together sebacic hydrazide and an aqueous solution of hydrazine and before the polymer reaches the required viscosity adding acetamide in a quantity less than 3 molar per cent based on the sebacic acid used and insufficient to prevent the polymer reaching the fibre-forming stage and continuing the heating until a fibre-forming polymer is produced.

FRIEDRICH GEORG KLEINSCHROD.
JAMES WOTHERSPOON FISHER.

REFERENCES CITED

The following references are of record in the file of this patent:

UNITED STATES PATENTS

| Number | Name | Date |
|---|---|---|
| 2,512,631 | Fisher et al. | June 27, 1950 |
| 2,512,633 | Fisher et al. | June 27, 1950 |